United States Patent [19]
Lehnert

[11] Patent Number: 5,755,010
[45] Date of Patent: May 26, 1998

[54] SPRING HINGES

[75] Inventor: Otto Lehnert, Sinsheim, Germany

[73] Assignee: O B E—Werk Ohnmacht & Baumgärtner GmbH & Co., KG, Ispringen, Germany

[21] Appl. No.: 617,749

[22] PCT Filed: Apr. 28, 1995

[86] PCT No.: PCT/EP95/01621

§ 371 Date: May 22, 1996

§ 102(e) Date: May 22, 1996

[87] PCT Pub. No.: WO95/30171

PCT Pub. Date: Nov. 9, 1995

[30] Foreign Application Priority Data

Apr. 30, 1994 [DE] Germany ............ 44 15 307.4

[51] Int. Cl.[6] .................................................. G02C 5/22
[52] U.S. Cl. ........................ 16/228; 351/113; 351/153
[58] Field of Search .......................... 16/228, 281, 286, 16/296; 351/113, 153

[56] References Cited

U.S. PATENT DOCUMENTS

| 4,351,086 | 9/1982 | Drlik ........................ 16/228 |
| 4,991,258 | 2/1991 | Drlik ........................ 16/228 |
| 5,018,242 | 5/1991 | Guy et al. ................. 16/228 |
| 5,400,090 | 3/1995 | Chen ........................ 16/228 |

FOREIGN PATENT DOCUMENTS

| 2641382 | 7/1990 | France ..................... 351/153 |
| 2268282 | 1/1994 | United Kingdom ........ 16/228 |

*Primary Examiner*—Chuck Mah
*Attorney, Agent, or Firm*—Anderson Kill & Olick, P.C.

[57] ABSTRACT

The invention relates to a spring hinge for eyeglasses with a spring member and a housing at least partially receiving the hinge member and which is open at one end surface thereof, with a closing member (13) fixedly retained in the housing (3) and having a run-on surface (38), which closes the end surface of the housing, and with an opening having guide surfaces (19, 21, 23) and extending through the closing member (13) for receiving the hinge member (11).

14 Claims, 6 Drawing Sheets

5,755,010

SPRING HINGES

The present invention relates to a spring hinge for eyeglasses and having a housing which receives a spring member and at least a portion of a hinge member.

Spring hinges of this type are known. They generally include a housing in which a spring member is received. The spring member provides for pivoting of an ear-piece connected with the spring hinge into a wear position and applies to the ear-piece a preload with which the ear-piece is pressed against the head of a glasses wearer. However, in certain cases, the manufacturing of the spring hinge proved to be rather expensive, which is a disadvantage.

Namely, machining of the inner space of the housing, in which the spring member was received, was necessary, which particularly in view of the small dimensions of the housing, required high precision and is, therefore, expensive.

It also turned out that guiding characteristics of such housing are not always satisfactory. It could also happen that the hinge member, which is connected with the ear-piece, was not reliably secured and, therefore, became loose. Relatively very extensive constructional costs are involved in the elimination of this drawback.

In addition, in spring hinges with a snap action, displacement of cams, which are present in the middle portion of the hinge, along an end surface of the housing presents a problem. In particular, the material characteristics of this run-on surface are adversely affected by heating required for soldering of the housing on the ear-piece. This results in that the run-on surface cannot sustain the cam pressure, applied to it for a certain time, and wears off, becoming damaged. Therefore, a reliable run-on cannot be insured any more.

Accordingly an object of the invention is a spring hinge which can be, on one hand, inexpensively produced and, on the other hand, is characterized by good guiding characteristics. In addition, the run-on surface should not lose its run-on characteristic upon being subjected to an extended pressure action.

This object is achieved in a spring hinge having the features recited in claim 1. Because the housing serves for receiving a closing member, which guides the hinge member and forms a run-on surface independent from the housing, the construction of the housing is simpler, on one hand, and on the other hand, a reliable guide for the hinge member and a run-on surface, the material of which is selected independent of the housing material, can be formed in accordance with specific requirements.

In addition, the object of the invention is achieved by a manufacturing process having features recited in claim 11. Because the housing, the closing member and/or the hinge member are stamped and/or formed from a simple and very inexpensive material, the manufacturing is very simple and cost-effective. In particular, expensive profiles and machining steps, such as milling or drilling, can be completely eliminated.

A further advantage results from using a material having a uniform thickness for manufacturing the housing. Then, in effect, the housing walls have a substantially the same thickness whereby, e.g., softening of the thinner regions during inductive heating of the housing is prevented.

Especially advantageous is an embodiment of a spring hinge in which the closing member, together with spring and hinge members received in the housing, is formed as a pre-assembled unit that can be easily inserted into the housing, already mounted on the ear-pierce of eyeglasses. The final assembly of a so formed spring hinge is, thus, simple and, therefore, can be economically effected.

Further embodiments of the spring hinge are set forth in further subclaims.

The invention will be explained below on the basis of the drawings. In the drawings.

The spring hinges of the above-described type are used for connecting of the ear-pieces of glasses to a middle section of the glasses. As a rule the spring hinge is attached to the ear-piece, and has a hinge member cooperating with the hinge of the middle section of the glasses to pivotally connect the ear-piece with the middle section. The ear-piece can be moved from its original position into its wear position, with the spring member of the spring hinge applying a return force.

Figure 1:
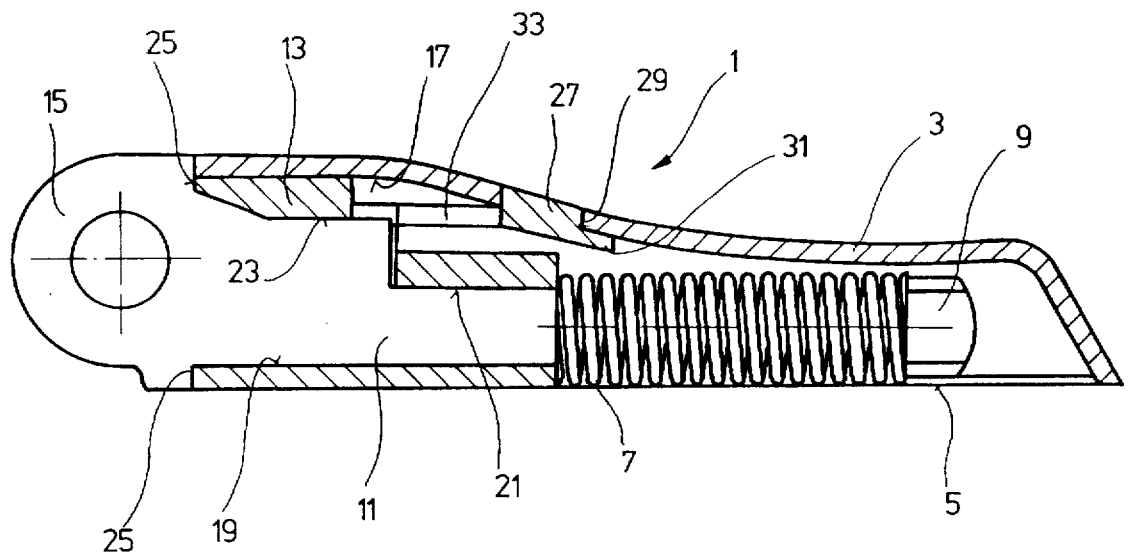
FIG. 1 is a cross-sectional view of a first embodiment of a spring hinge.

The spring hinge 1 according to the present invention, which is shown in FIG. 1 showing its longitudinal cross-section, includes a housing 3 that is produced of a deformable material, e.g., metal, by a deep-drawing process, preferably by an embossing process. The process, which is used for manufacturing of the housing 3, will be described in detail below with reference to FIG. 16. The housing 3 is open at its bottom 5. A spring member 7, which is formed as a helical spring, is located in the housing 3 and is supported on an elongate extension 9 of a hinge member 11. The extension 9 is formed as an elongate pin that extends through the helical spring and is widened at its end by, e.g., by crimping, so that an abutment for the helical spring is formed. At its opposite end, the helical spring, i.e. the spring member 7, abuts a closing member 13 which is located in the housing and through which the hinge member 11 extends. The closing member 13 is completely received in the housing 3. The hinge member 11 has a gudgeon 15 at its end projecting out of the housing 3. The gudgeon 15 cooperates with a hinge provided on the middle section of the glasses (not shown). The spring member 7 and the closing member 13 are so dimensioned that no part of the spring member 7 and the closing member 13 projects through the bottom 5 of the housing 3. Rather, the surfaces of the spring member 7 and the closing element 13 are made flash with the bottom surface of the housing 3 which is supported on an outer surface of the ear-piece and is fixedly attached thereto, e.g., by soldering.

The gudgeon 15 and the hinge member 11 are formed as one piece. The extension 9 is also a part of the hinge member 11, so that the number of elements forming the spring hinge according to the present invention is reduced to a minimum. After the spring member 7, which is formed as a helical spring is mounted on the extension 9 the end of which is then crumped, the spring member 7 and the hinge member 11 form a unit.

Because the closing element 13 is aligned with the bottom 5 of the housing 3, the bottom of the closing element 13 lies flatly on the outer surface of the ear-piece when the housing 3 is secured to the ear-piece. On the other hand, the closing member 13 is supported, adjacent to the end surface of the housing 3, against the housing inner surface 17. In an assembled condition of the hinge 1, the closing member 13 is optimally retained in the housing 3.

The closing member 13 has a smooth inner surface 19 on which the hinge element 11 lies. The inner surface 19 serves as a first guide surface for the hinge member 11 which is displaceable against the biasing force of the spring member 7. The second guide surface 21 is formed as a result of the hinge member being surrounded, at least partially, by the closing element 13. The third guide surface 23 is formed by an inner surface portion of the closing member 13 which is engaged by a respective surface of the hinge member 11.

The gudgeon 15 is so dimensioned that its stop shoulder 25 abuts an end surface 35 of the housing 3, which thus serves as a stop surface, when the hinge member 11 is drawn to the end surface 35 of the housing 3 by the preloaded spring member 7.

Because the hinge member 11 extends through the closing member 13 and because the spring member 7, which is supported against the wider portion 9 of the hinge member 7, applies a preloading force to the hinge member 11, there is provided a ready-to-be-used assembly consisting of the hinge member 11 the spring member 7, and the closing member 13.

The assembly is inserted into the housing 3 after the housing 3 is attached to the ear-piece, e.g., by welding or soldering. The closing member is provided with a catch nose 27 hingedly attached to the body of the closing member 13 and which engages the opening 29 provided in the wall of the housing 3. The abutment shoulder 31 of the catch nose 27 prevents the catch hose 27 from projecting out of the opening 29 of the housing 3 and insures that the outer surface of the catch nose 27 is flash with the outer surface of the housing 3.

Generally, the opening 27 can be formed as depression in the wall of the housing 3 into which the catch nose extends thereby providing for retaining of the closing member 13 in the housing 3. In the embodiment of the spring hinge shown in FIG. 1, the opening or recess 29 extends through the entire thickness of the housing wall so that the catch nose 27 is accessible from outside and, therefore, can be easily disengaged. The catch nose 27 is connected with the body of the closing member 13 by a spring arm 33.

Figure 2:
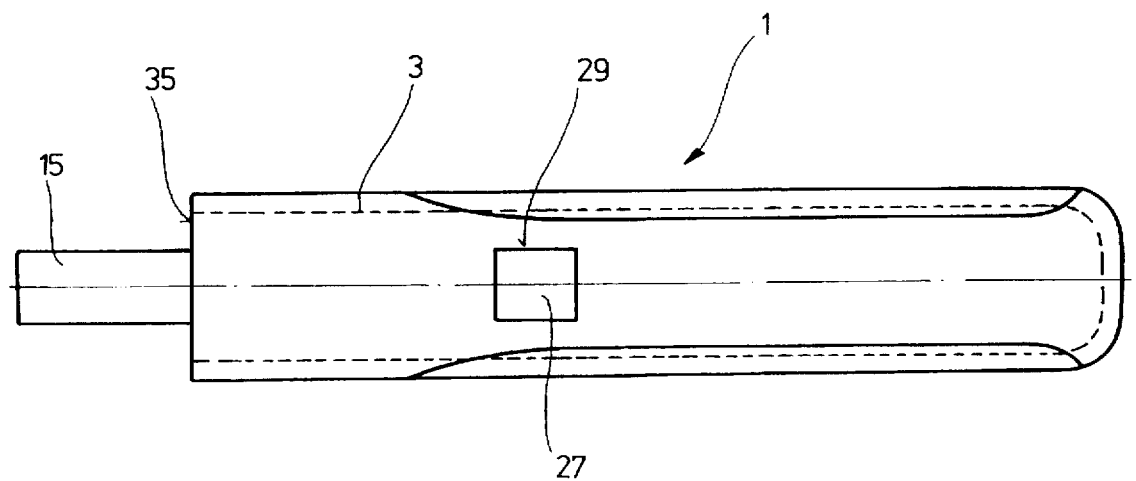
FIG. 2 is a plan view of the spring hinge shown in FIG. 1.

FIG. 2 shows that the gudgeon 15 projects from the end surface 35 of the housing 3 and is narrower than the latter. FIG. 2 also shows that the opening 29 for receiving the catch nose 27 is square. The dimensions of the opening 29 and the catch nose 27 are so selected that the inside of the housing 3 is protected from the penetration of dirt thereunto. Corresponding, the dimensions of the closing element 13 are selected to likewise prevent the penetration of dirt into the inside of the housing 3 from the housing end surface 35.

Figure 3:
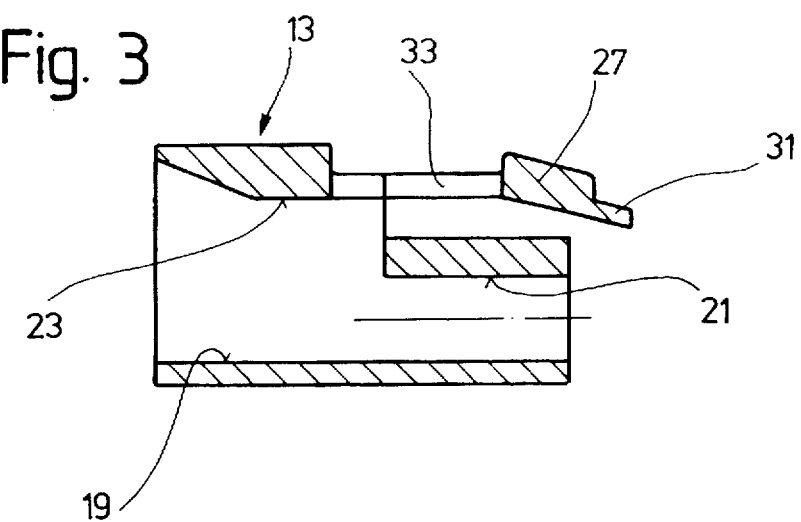
FIG. 3 is a longitudinal cross-sectional view of a closing element arranged in a housing of the spring hinge shown in FIG. 1.

FIG. 3 shows the closing member 13 in a non-assembled condition. Here, the inner surface 19 serves as a guide surface for the hinge member 11. In addition, the inner surfaces of the closing member 13 include a second guide surface 21 and a third guide surface 23. The guide surfaces 19, 21 and 23 so cooperate with each other that the hinge member 13 is displaced in the interior of the closing member 13 practically clearance-free. This insures an optional displacement of the hinge member 11 in the inferior of the housing 3.

FIG. 3 also clearly shows the arm 33, which was discussed with reference to FIG. 1 earlier, with the catch nose 27 and the abutment shoulder 31.

The inner dimensions of the closing member 13 are so adapted to those of the hinge member 11 that the hinge member 11, as it has already been discussed above, is displaced practically clearance-free.

Figure 4:
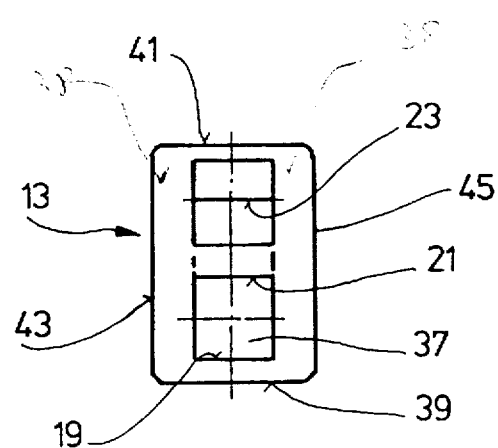
FIG. 4 is a front view of the closing member shown in FIG. 3.

The front view of the closing member 13, which is shown in FIG. 4, demonstrates that practically a square passage 37 is formed between the guide surfaces 19 and 21 through which the hinge member 11, which preferably has a likewise square section corresponding to this passage, extends. FIG. 4 also shows a third guide surface 23. In addition, FIG. 4 shows an end surface 38 which defines its run-on surface. The exact function of which will be discussed below.

The shape of the closing member 13 is adapted to the inner profile of the housing 3, so that, in an assembled condition of the spring hinge 1, the bottom 39 of the closing member 13 lies on the outer or upper surface of the ear-piece, with the top surface 41 abutting the inner surface 17 of the housing 3 and the side surfaces 43, 45 abutting respective inner side surface of the housing 3. In the assembled condition of the spring hinge 1, the closing member 13 is, thus, retained in the interior of the housing 3 practically clearance-free.

FIG. 4 also shows that the closing member 13 encloses the hinge member 11 from all sides, whereby a unitary structure described above, is formed.

Figure 5:
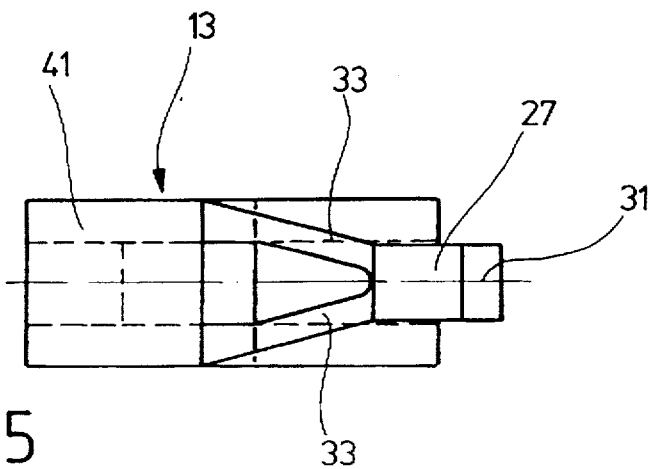
FIG. 5 is a plan view of the closing member shown in FIGS. 3–4.

The plan view of the closing member 13, which is shown in FIG. 5, demonstrates that the width of the catch nose 27 is smaller that the width of the closing member 13 itself. The spring arm 33, which supports the catch nose 27 can be formed as a continuous bridge. However, a smaller arm can be used or, as shown in the shown embodiment, two substantially V-shaped spring arms 33 can resiliently connect the catch nose 27 with the body of the closing member 13.

The catch nose 27, which according to FIG. 1 or 3 has an upper surface which is formed as a inclined surface. It forms a quasi snap connection that holds the assembly, which is formed of the spring member 7, hinge member 11, and the closing member 13 in the interior of the housing 3. The catch nose 27 in held in the opening 29 of the housing 3 due to spring action of the spring arms 33.

The hinge member 11 as well as the closing member 13 are preferably formed of metal, in particular of nickel-free metal, preferably of titanium. This prevent an allergic reaction in a glasses wearer, on one hand, and on the other hand, reduces wear.

Figure 6:
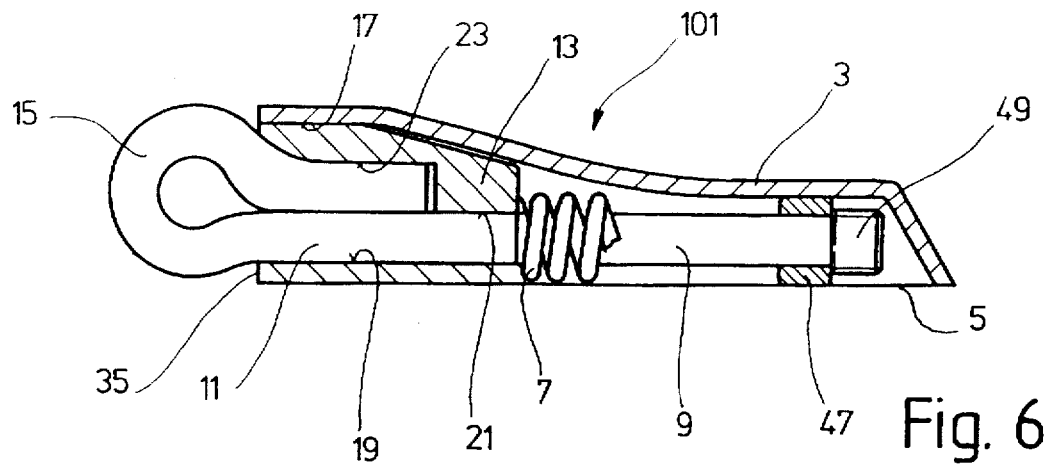
FIG. 6 is a cross-sectional view of another embodiment of a spring hinge.

FIG. 6 shows another embodiment of a spring hinge according to the present invention. In FIG. 6, the same reference numeral will be used for parts corresponding to the identical parts of the hinge spring shown in FIGS. 1–5. In the embodiment shown in FIG. 6, the spring hinge 101 has likewise a housing 3 in which a closing member 13 is received. A hinge member 11 extends through the closing member 11 and has an elongate extension 9 which extends through a spring member 7 which is also formed as a helical spring. The spring member 7 is supported at one end by the closing member 13 and, at the other end, by a stop ring 47 supported on the extension 9 of the hinge member 11 and is retained, e.g., by a widened portion formed at the free end of the hinge member 7. The spring member 7 is mounted on the extension 9 in a pre-loaded condition so that the hinge member is so drawn into the closing member 13 that the gudgeon 15 is drawn to the end surface 35 of the housing 3 and to the end surface of the closing member 13.

The housing 3 is so formed that neither the spring member 7 nor the hinge member 11 projects through the bottom 5 of the housing 3. Thus, when the housing 3 is mounted on a earpiece, e.g., is sodded thereto, the bottom of the closing member 13 flatly lies on the upper surface of the ear-piece. The top surface of the closing member 13 abuts the inner surface 17 of the housing 3 so that in the assembled condition of the spring hinge the closing member 13 is reliably held in the interior of the housing 3 and forms a guide for the hinge member 11. The hinge member 11 has its surfaces supported on first and second guide surfaces 19 and 21 located adjacent to the support surface for the spring member 7. Closely to the end surface 35 of the housing 3, the closing member 13 has an inner guide surface 23 which is located opposite the first guide surface 19. The distance of the third guide surface 23 from the first guide surface 19 is greater than the distance of the second guide surface 21 from the surface 19 the hinge member 11 in this region has a greater height.

Preferably, the hinge member 7 is formed as a bent member, namely, as an elongate wire part which forms, in the gudgeon region, an eyelet having a backward extending portion which is supported against the third guide surface 23. The hinge member 11 of this embodiment can be produced very economically. A discussion of manufacturing of the hinge member 11 will be made below with reference to FIG. 17.

Figure 7:
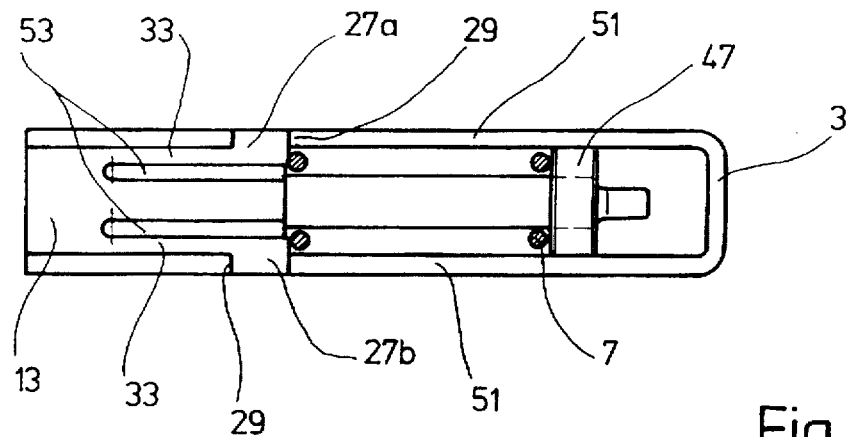
FIG. 7 is a bottom view of the spring hinge shown in FIG. 6.

From the bottom view of FIG. 7, it can be seen that the strop ring 47 is supported against inner surfaces of the housing 3 and, thus, can be reliably guided along the extension 9. The side walls of the closing member 13 adjoin the sides of the housing 3, insuring a reliable guiding of the closing member 13 in the housing 3.

The closing member 13 has two catch noses 27a and 27b which are resiliently supported by spring arms 33 on the body of the closing member 13. The catch noses 27a and 27b engage in openings 29 provided in side walls of the housing 3. Generally, the openings 29 are formed as indentations in side walls of the housing 3 in which the catch noses 27a and 27b engage. In the embodiment of FIG. 6, the openings 29 are formed as through openings, and the outer surfaces of the catch noses 27a and 27b are flash with the side outer surfaces of the housing 3 when the catch noses 27a and 27b engage in the openings 29. Thus, a visual appearance of the spring hinge 101 is no way disturbed, and the catch noses 27a and 27 are easily accessible for possible removal of the closing body 13. The catch noses 27a and 27b are engaged in the openings 29 with a snap action. The locking action of the spring arms 33 is assisted by the spring action of the spring member 7 which acts on inner sides of the catch noses 27a and 27b so that they are biased outwardly in the openings 29. When the ear-piece is overstretched, the hinge member 11, which is displaceable in the housing 3 against the biasing force of the spring member 7, is drawn out of the housing 3, and the spring member 7 becomes compressed. Thereby, the spring forces, which act in a locking direction of the catch noses 27a and 27b, increase, and as a result, the anchoring of the closing member 13 in the interior of the housing is insured when the spring hinge is loaded.

In the embodiment of FIG. 7, the bottom of the closing member 13 is practically closed. In this embodiment, the closing member 13 is provided with two slots 53 which define the spring arms 33 which connect the catch noses 27a and 27b with the closing member 13.

Figure 8:
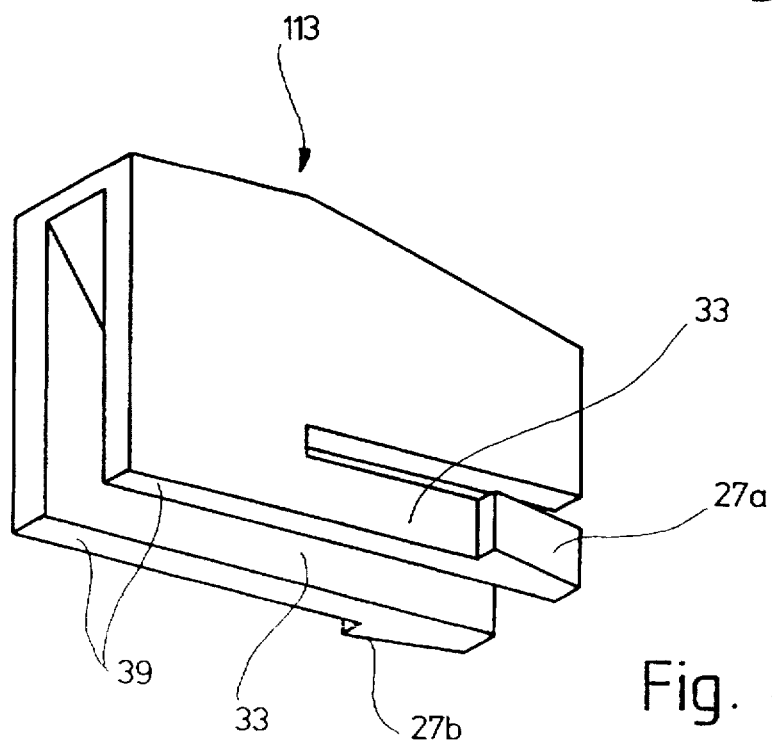
FIG. 8 is a perspective view of the closing member of the hinge spring.

FIG. 8 shows a lighter closing member 13 which is characterized in that its bottom is open. In this embodiment, the hinge member, which is not shown in FIG. 8, is guided by the second and third guide surfaces 21 and 23 shown in FIG. 6 on one hand, and by an upper surface of an ear-piece which support the closing member, on the other hand.

The perspective bottom view of the closing member 113, clearly shows the shape of the catch noses 27 and 27b, which have a somewhat conical surface that provides for the above-discussed snap connection when the catch noses 27a and 27b are pushed outwardly by the spring arms 33.

The bottom 39 of the closing member 113 is made even so that it flatly lies on an upper surface of an ear-piece, insuring an optimal guidance of the hinge member 11.

The spring hinge of the embodiments of FIGS. 1 and 6 is characterized in that the unit, which is formed of the hinge member, spring member and the closing member and is inserted into the housing secured on the ear-piece, can be removed as necessary because the catch noses of the closing member are accessible from outside when the spring hinge is secured to the ear-piece.

Figure 9:
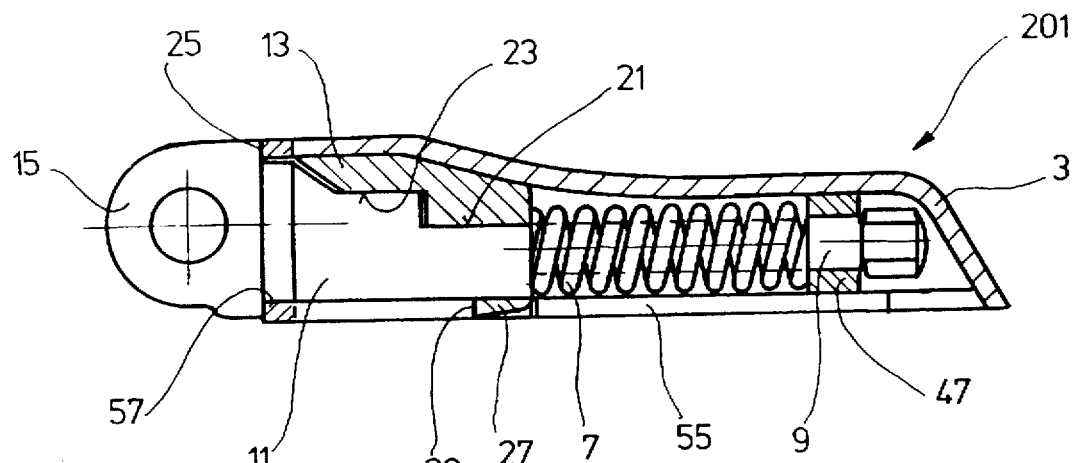
FIG. 9 is a cross-sectional view of a further embodiment of a spring hinge.

FIG. 9 shows another embodiment of a spring hinge 201 which has a housing 3, with the spring member 7 and the hinge member 11 being received in the housing interior. The hinge member 11 has an elongated extension 9 and a gudgeon 15 both forming parts of the one-piece hinge member 11. The hinge member 11 extends in the closing member 13 which surround the hinge member 11 at least as a horseshoe.

Figure 10:
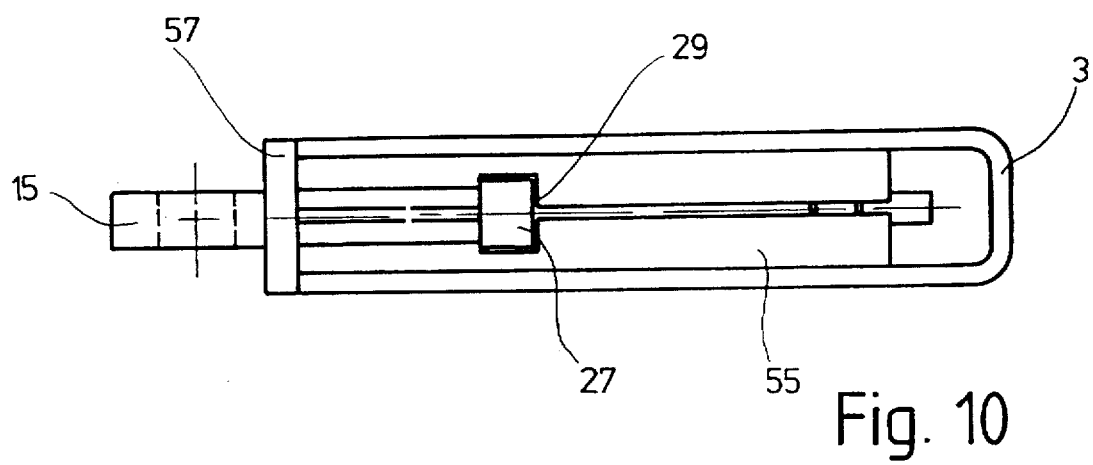
FIG. 10 is a bottom view of the spring hinge shown in FIG. 9.

As shown in FIG. 10, the housing 3 differs from the housing of the embodiments of FIGS. 1 and 6 in that it has a bottom 55 which encloses the assembly formed of the spring member 7, hinge member 11 and the closing member 13.

The closing member 13 is likewise provided with the catch nose 27 engaging in an opening 29 of the housing 3. In this embodiment, the opening 29 is formed in the bottom 55. Thus, after the spring hinge 102 is mounted on an ear-piece, the catch nose 27 is not accessible any more. The interior of the housing 3 is better protected from dust and dirt as well as from the waste resulting from soldering of the housing to the ear-piece. The spring member 7 is supported at one end thereof against a stop ring 47 secured on the extension 9 of the hinge member 11. The stop ring 47 is prevented from being dislodged by the deformation of the end portion of the extension 9.

The hinge member 11 lies with its bottom flatly on the inner surface of the bottom 55 which forms a first guide surface. The second guide surface 21 is formed adjacent to the spring member 7, and the third guide surface 23 is formed adjacent to the end surface of the housing 3. Providing these three guide surfaces insure a reliable guidance for the hinge member 11 in the closing member 13. The interior dimensions of the closing member 13 are so matched with those of the hinge member 11 that an optimal guidance of the hinge member 11 in the closing member 13 is insured.

Between the end surface of the housing 3 and the hinge gudgeon 15 which has a stop surface 25, a closing plate 57 can be provided for preventing the penetration of dirt into the interior of the housing 3.

As it is clearly seen in FIG. 10, the hinge member 11 is smaller than the housing 3. FIG. 10 further shows that the opening 29 is a through-opening which surrounds the catch nose 27 from all sides.

Figure 11:
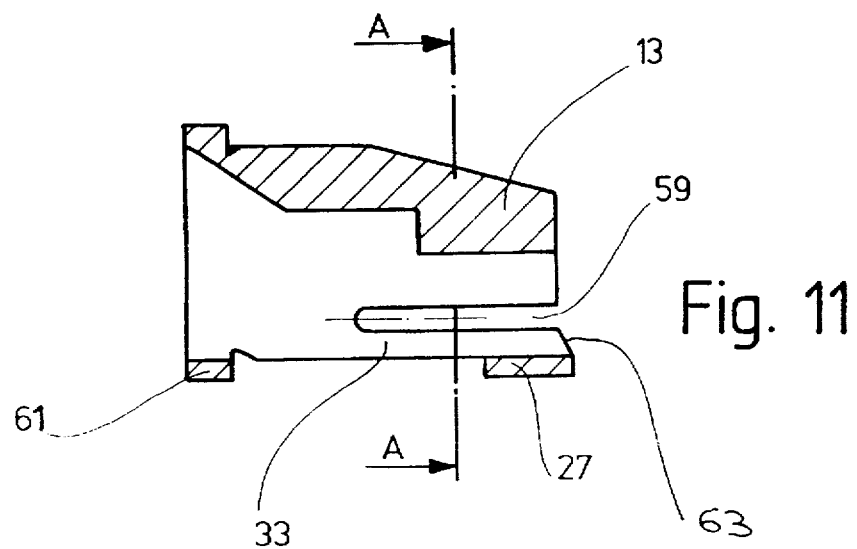
FIG. 11 is a longitudinal cross-sectional view of a closing element for the spring hinge shown in FIG. 9.

FIG. 11 shows a longitudinal cross-section of the closing member 13. A spring arm 33, which connects the catch nose 27 to the body of the closing member 13, formed, as shown in FIG. 11, by a bar separated from the body of the closing member 13 by a slot 59. As shown further in FIG. 11, the closing member 13 can be provided with a bead 61 which served for closing the end surface of the housing 3 and can be used instead of the closing plate 57 shown in FIG. 9. In this case, the closing member forms a stop or the hinge member 11 and provides for a particular good guidance of the hinge member 11 in its interior.

The spring arm 33 can have its inner surface formed as a run-on inclined surface to which the spring member 7 applies a downward directed loading force displacing the catch nose 27 into its locking position. When the hinge member 11 is axially displaced leftward, in FIG. 9, the spring member applies an increased biasing force to the catch nose 27 providing for its better anchoring in the opening 29 in the bottom 57 of the housing 3.

Figure 12:
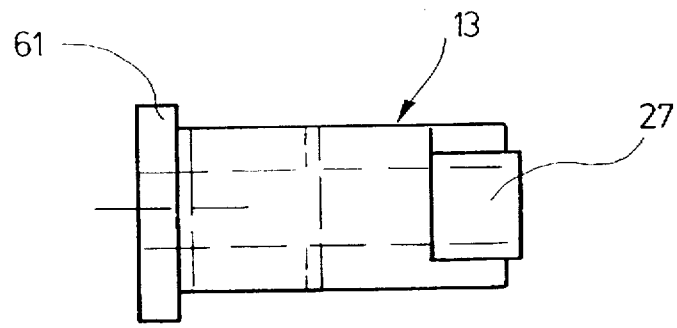
FIG. 12 is a bottom view of the closing member shown in FIG. 11.

As shown in FIG. 12, the width of the catch nose 27 is smaller than the width of the closing member 13, whereas the width of the bead 61 exceeds the width of the closing member 13, insuring closing of the end surface of the housing 3, with the run-on surface 38 on the cross-section of the housing 3 at the end surface being increased.

In the second and third embodiments, the housing is formed of a deformable material, preferably a material which can be deep-drawn. The closing member and the hinge member can be formed of plastic materials. However, preferably, a nickel-free material, such as titanium, is used for manufacturing the closing and hinge members.

Figure 13:
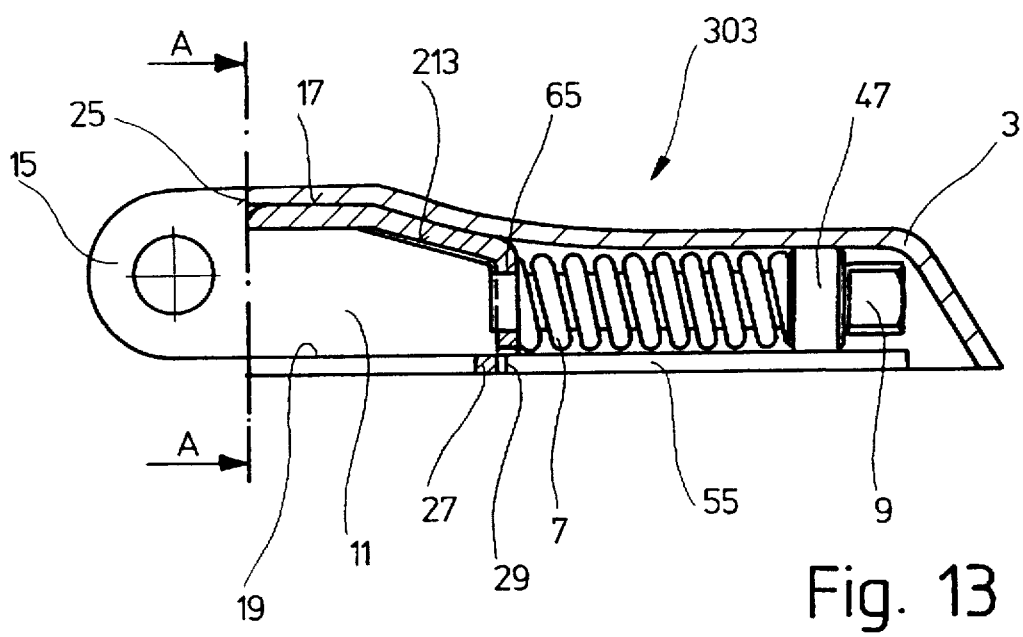
FIG. 13 is a cross-sectional view of a still further embodiment of a spring hinge.

FIG. 13 shows a yet another embodiment of a spring hinge 303 having a housing 3 with a bottom 55. A spring member 7, which is formed, e.g., as a helical spring, is received in the housing and is displaced on the elongate extension 9 of the hinge member 11 and is supported against a stop ring 47 supported by a widened portion of the extension 9. The stop ring 47 forms a first stop for the spring member 7, with the closing member 213 defining another stop.

The closing member 13 (should be hinge member 11 translator's remark) is provided with a gudgeon 15 which projects from the housing 3 and the dimensions of which are so selected that the stop surface 25 of the gudgeon 15 abuts the end surface of the housing 3. With the spring member being preloaded, the gudgeon 15 is pressed against the end surface of the housing 3.

The bottom 55 of the housing 3 has a through-opening 29 in which a catch nose 27 of the closing member 213 engages. The closing member 13 is formed as a bent sheet material piece. The closing member 213 provides guide surfaces for a horizontal displacement of the hinge member 11 against the biasing force of the spring member 7. The closing member 213 has an opening 65 the circumference surface of which is so matched with the profile of the extension 9 of the hinge member 11 that the circumference surface forms a hinge displacement guide.

The closing member 213 has its upper surface flatly lying on the inner surface 17 of the housing 3 and its bottom side lying on the inner surface of the bottom 55 of the housing 3, which insures an optimal retaining of the closing member 213 in the housing 3.

Figure 14:
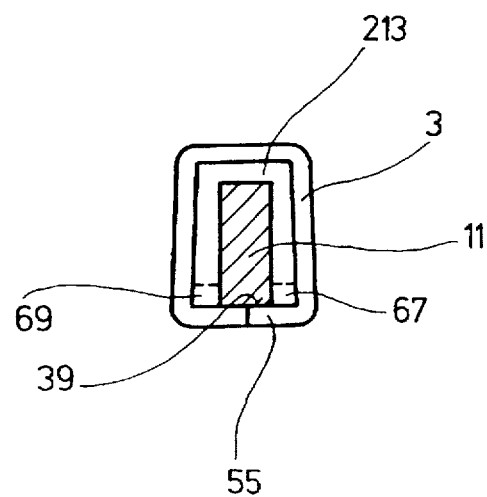
FIG. 14 is a cross-sectional view along line A—A in FIG. 13.

FIG. 14, shows a cross-section along line A—A in FIG. 13, in which the outer surfaces of the closing member 213 all lie on the respective inner surfaces of the housing 3 so that the closing member 213 is surrounded from all sides by the inner surfaces of the housing 3, whereby the closing member 213 is reliably contained in the housing 3. The closing member 213 has, at a bottom thereof, two side arms 67 and 69 the inner surfaces of which serve as guides for the hinge member 11. The bottom 39 of the closing member 213 flatly lies on the bottom 55 of the housing 3, insuring appropriate guiding of the hinge member 11.

Figure 15:
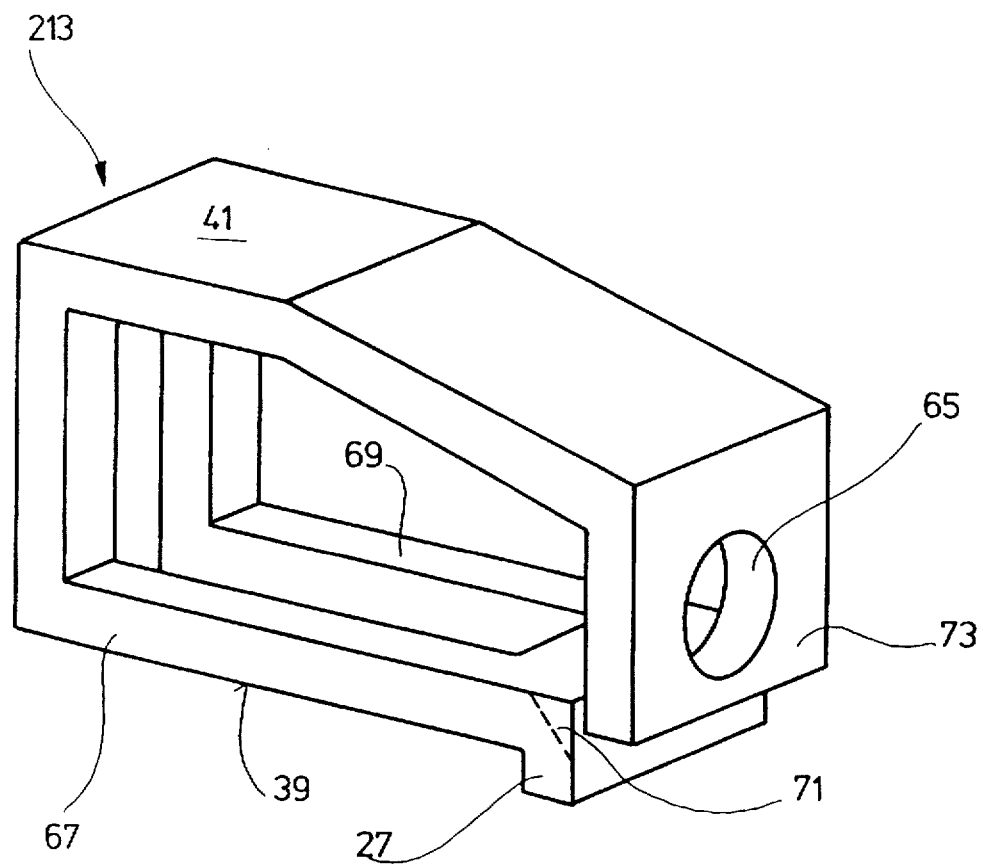
FIG. 15 is a perspective view of a closing member used with the spring hinge shown in FIG. 13.

FIG. 15, shows a principle perspective view of a closing member 213 shown in FIGS. 13–14. The closing member 213 has arms 67 and 69, the adjacent inner surfaces of which abut the outer side of the hinge member 11 and form guide surfaces. FIG. 15 also shows an opening 65 through which the extension 9 projects and the inner surfaces of which form guide surfaces for the extension.

The side arms 67 and 69 serves as spring arms for the catch nose 27 which reliably retains the closing member 213 after its insertion into the housing 3.

In the above-shown embodiments, the hinge member 11 has a gudgeon 15 and an extension 9. Because the hinge member 11 in all of the embodiments extends through the closing member, the spring member 7, the hinge member 11, and the closing member 213 form a unitary assembly that can easily be inserted into the housing 3.

In the embodiments in which the housing 3 has a bottom 55, the unitary assembly of a spring is inserted in the housing 3 before the housing is secured to an ear-piece whereby a spring hinge assembly is formed. Then, the housing 3 can be secured on the ear-piece in any suitable manner, wherein, in view of spring characteristics of the spring hinge assembly, gluing is a preferable method. When soldering or welding on an ear-piece, the unitary assembly is inserted in the housing after the housing is secured on the ear-piece. This prevents the closing member from being subjected to the heat, associated with soldering or welding, which would adversely affect the steadiness of the run-on surface of the closing member.

In the transition region between the side or spring arms 67, 69 and the catch nose 27, an inclined surface 71, as shown in FIG. 15, is provided. When a spring force is applied to the arm 73 of the closing member 213, the arm 73 is pressed against the inclined surface 71, pressing the catch nose 27 downward, further into its locking position. Thus, when an additional load is applied to the spring member 7, as a result of displacement of the hinge member 11 leftward, the locking action of the catch nose 27 is increased by the run-on inclined surface 71. The spring hinge 303, shown in FIGS. 13–15, is characterized by an especially economical manufacturing of the closing member 213, which can be reliably retained in the spring hinge housing 3, with the upper surface 41 of the closing member 213 firmly abutting the inner surface 17 of the housing 3 and with bottom surfaces of the arms 67, 69 flatly lying on the inner surface of the bottom 55 of the housing 3 (see FIG. 3). Due to the reliable retention of the closing member 213 in the housing 3, an optimal guidance of the hinge member 11 is insured even when the closing member 213 is formed from a sheet material insuring the inexpensive manufacturing of the closing member.

In case of the unitary assembly of the spring, hinge and closing members being inserted in a housing having a bottom with an opening in which the catch nose of the closing member engages for retaining the unitary assembly in the housing, after the housing is secured on the ear-piece, the unitary assembly cannot be withdrawn from the housing any more because the catch nose is not accessible from the outside. If the spring hinge is formed as a prefabricated unit and then is secured on an ear-piece, the catch nose remains accessible before the unit is secured on the ear-piece. In this case, the unitary assembly of the spring, hinge and closing members can be withdrawn from the housing.

In all of the cases, the simple construction of the unitary assembly insures its easy mounting in a housing secured or securable on an ear-piece, a reliable retaining of the closing member in the housing, and at the same time, optimal displacement of the hinge member in the housing. In addition, the closing member is provided with a run-on surface with optimal characteristics which are not adversely affected by tempering during soldering or welding of the housing to an ear-piece.

In all cases, a simply manufactured stamping can be used as a housing which insures economical manufacturing of the spring hinge. Because the closing member is surrounded by the housing at least from three sides, with the fourth side being closed by an ear piece, dust, lacquer and/or polishing compounds cannot penetrate into the spring hinge, which insures a very high functionality of the spring hinge. Because the end surface of the housing is also practically completely closed by the closing member and firmly abuts an ear-piece, a spring hinge completely protected from any penetration of dirt is produced, without any substantial expenses. Also, the use of the closing member for guiding of the hinge member further reduces the constructional expenses and the manufacturing costs.

As it has already been mentioned, the housing and the hinge member are economically produced from a metal strip by stamping and shaping each consisting only of a few operational steps. Machining operations are not anymore necessary.

Also, the closing member described in the specification can be produced, in a similar manner as the housing and the hinge member, from a metal strip, with the use, preferably, of pressing and die stamping, e.g., bending. Here also preferably, a nickel-free metal, e.g., titanium is used.

The smaller dimensional accuracy of the stamping and shaping technology (in comparison with the conventional machining) can be compensated by insertion of an appropriate closing member. From the description, it is clear that the manufacturing of the above-mentioned parts is very simple and, therefore, extremely cost-effective. Expensive profiles, from which the housing and the hinge member were cut-out, are eliminated. Also, the necessary machining of the cut-out profiles is eliminated by the foregoing manufacturing processes.

The spring hinge shown in FIGS. 1–15 is characterized in that the hinge member which, together with the spring and closing members, form a unitary assembly is easily insertable into the housing and is reliably secured therein, and in that closing member is formed as a snap-locking element. Upon the insertion, the unitary assembly is locked in the housing, without any need for other connecting means which makes assembling of the spring hinge more expansive.

Despite an easy assembly, a very exact guidance of the hinge member is achieved because it is guided entirely through the closing member. In the embodiment shown in FIG. 8, the guiding of the hinge member is insured by forming the closing member as a U-shaped member, with the hinge member flatly abutting the ear-peace on which the spring hinge is mounted. Thus, guiding of the hinge member on all sides of the hinge member is insured.

An especially good guiding of the hinge member is insured when the geometrical parameters of the closing member, length L, height H and the width B, have the following relationship: L>H>B. These dimensions insure, on one hand, a reliable retaining of the closing member in the housing, insuring a clearance-free seating of the closing member in the housing, and, on the other hand, a good guiding of the hinge member due to the reliable retaining of the closing member in the housing and due to a clearance-free displacement of the hinge member in the closing member.

Though the spring hinge has a very economically produced stamped housing in which the unitary unit can easily and simply be secured, very high technical characteristics are achieved that up to the present could be achieved only with very high manufacturing costs.

The cost-effective manufacturing of a spring hinge is achieved by eliminating special guide means in the spring hinge housing due to a particular shape of the closing member which also permitted to eliminate special locking elements used up to now for securing the hinge member inside the housing.

I claim:

1. A spring hinge for attaching glasses ear-pieces, comprising:
   an elongate housing having an open end surface;
   an elongate hinge member having an extension and a gudgeon and at least partially received in the housing;
   a spring member located in the housing, the spring member compressing upon pulling of the hinge member out; and
   a closing member fixedly retainable in the housing and having an end surface for closing the open end surface of the housing and defining a run-on surface of the closing member, and guide surface means defining, at least partially, an opening for receiving the hinge member and along which the hinge member is longitudinally displaceable.

2. A spring hinge according to claim 1 wherein the housing has a bottom.

3. A spring hinge according to claim 2, wherein the bottom is formed integrally with the housing.

4. A spring hinge according to claim 1, wherein the housing has walls of substantially the same thickness.

5. A spring hinge according to claim 1, wherein the closing, spring and hinge members are assembled together as a pre-assembled unit before being mounted in the housing.

6. A spring hinge according to claim 5, wherein the spring member is secured on the closing member.

7. A spring hinge according to claim 1, wherein the closing member has a catch nose, and wherein at least one of a side wall and a top of the housing has a recess for receiving the catch nose of the closing member.

8. A spring hinge according to claim 1, wherein the closing member has a substantially U-Shaped cross-section.

9. A spring hinge according to claim 1, wherein the housing and the hinge, spring and closing members form a pre-assembled sub-assembly.

10. A spring hinge according to claim 1, wherein the closing member is formed as a snap-locking member.

11. A spring hinge according to claim 1, wherein the closing member has a length larger than a height thereof, and a width smaller than the height.

12. A spring hinge according to claim 1, wherein the housing and at least one of the closing member and the hinge member are formed as one of press metal pieces and shaped metal pieces.

13. A spring hinge according to claim 1, wherein the housing and the closing and hinge members are formed of a nickel-free material.

14. A spring hinge according to claim 1, wherein the housing and the closing and hinge members are formed of titanium.

* * * * *